(12) United States Patent
Schob et al.

(10) Patent No.: US 6,249,067 B1
(45) Date of Patent: Jun. 19, 2001

(54) METHOD AND SENSOR ARRANGEMENT FOR THE DETERMINATION OF THE RADIAL POSITION OF A PERMANENT MAGNETIC ROTOR

(75) Inventors: Reto Schob, Volketswil; Natale Barletta, Zürich, both of (CH)

(73) Assignees: Sulzer Electronics AG, Winterthur (CH); Lust Antriebstechnik GmbH (DE)

( * ) Notice: Subject to any disclaimer, the term of this patent is extended or adjusted under 35 U.S.C. 154(b) by 0 days.

(21) Appl. No.: 09/369,084

(22) Filed: Aug. 4, 1999

(30) Foreign Application Priority Data

Aug. 24, 1998 (EP) .................................................. 98810832

(51) Int. Cl.$^7$ .............................. H02K 11/00; H02K 7/09
(52) U.S. Cl. ........................................ 310/68 B; 310/90.5
(58) Field of Search ............................... 310/68 B, 90.5, 310/166, 168; 324/207.2, 207.22, 207.25

(56) References Cited

U.S. PATENT DOCUMENTS

| 4,686,404 | * | 8/1987 | Nakazeki et al. | 310/90.5 |
|---|---|---|---|---|
| 5,093,754 | * | 3/1992 | Kawashima | 361/144 |
| 5,095,237 | * | 3/1992 | Bardas et al. | 310/90.5 |
| 5,148,069 | * | 9/1992 | Nonaka et al. | 310/68 R |
| 5,469,005 | * | 11/1995 | Asama et al. | 310/68 B |
| 5,760,510 | * | 6/1998 | Nomura et al. | 310/90.5 |
| 5,925,957 | * | 7/1999 | Chalman | 310/90.5 |
| 6,057,681 | * | 5/2000 | Kipp et al. | 324/207.2 |

FOREIGN PATENT DOCUMENTS

| 0531588A1 | 3/1993 | (EP) . |
|---|---|---|
| WO 96/31934 | 10/1996 | (WO) . |
| WO 97/07340 | 2/1997 | (WO) . |

OTHER PUBLICATIONS

Patent Abstracts of Japan, vol. 16, No. 157 (M–1236), Apr. 16, 1992 & JP 04 008911A (Toshiba Corp), Jan. 13, 1992; Abstract.
Patent Abstracts of Japan, vol. 97, No. 7, Jul. 31, 1997 & JP 09 088955A (Koyo Seiko Co Ltd), Mar. 31, 1997; Abstract.
Patent Abstracts of Japan, vol. 96, No. 1, Jan. 31, 1996 & JP 07 238928 A (Toshiba Corp), Sep. 12, 1995; Abstract.

* cited by examiner

Primary Examiner—Nestor Ramirez
Assistant Examiner—Dang Dinh Le
(74) Attorney, Agent, or Firm—Townsend and Townsend and Crew LLP

(57) ABSTRACT

In a method for the determination of the radial position of a permanent magnetic rotor (1) in an electromagnetic rotary drive which is designed as a bearing-free motor with a stator (2) and the magnetically journalled rotor (1) the magnetic flux which is produced by the rotor (1) is determined by means of sensors (LS1, LS2, LS3) in the space between the rotor (1) and the stator (2) at least at two different measurement locations. The radial position of the rotor (1) is established with the help of the magnetic flux which is determined at the measurement locations and with the help of the magnetic flux which results at the measurement locations when the rotor (1) is arranged so as to be centered. Furthermore, a sensor arrangement for the determination of the radial position of the permanent magnetic rotor is proposed.

6 Claims, 7 Drawing Sheets

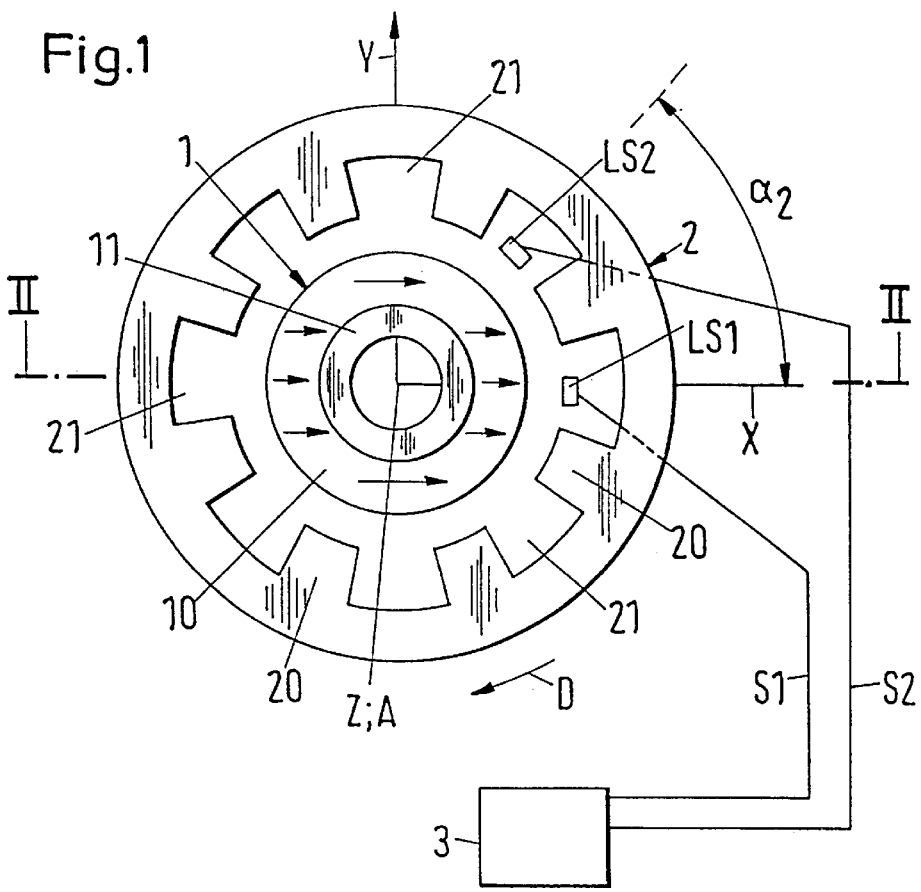
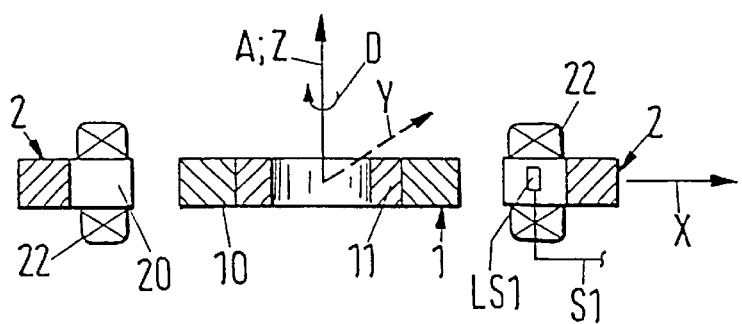

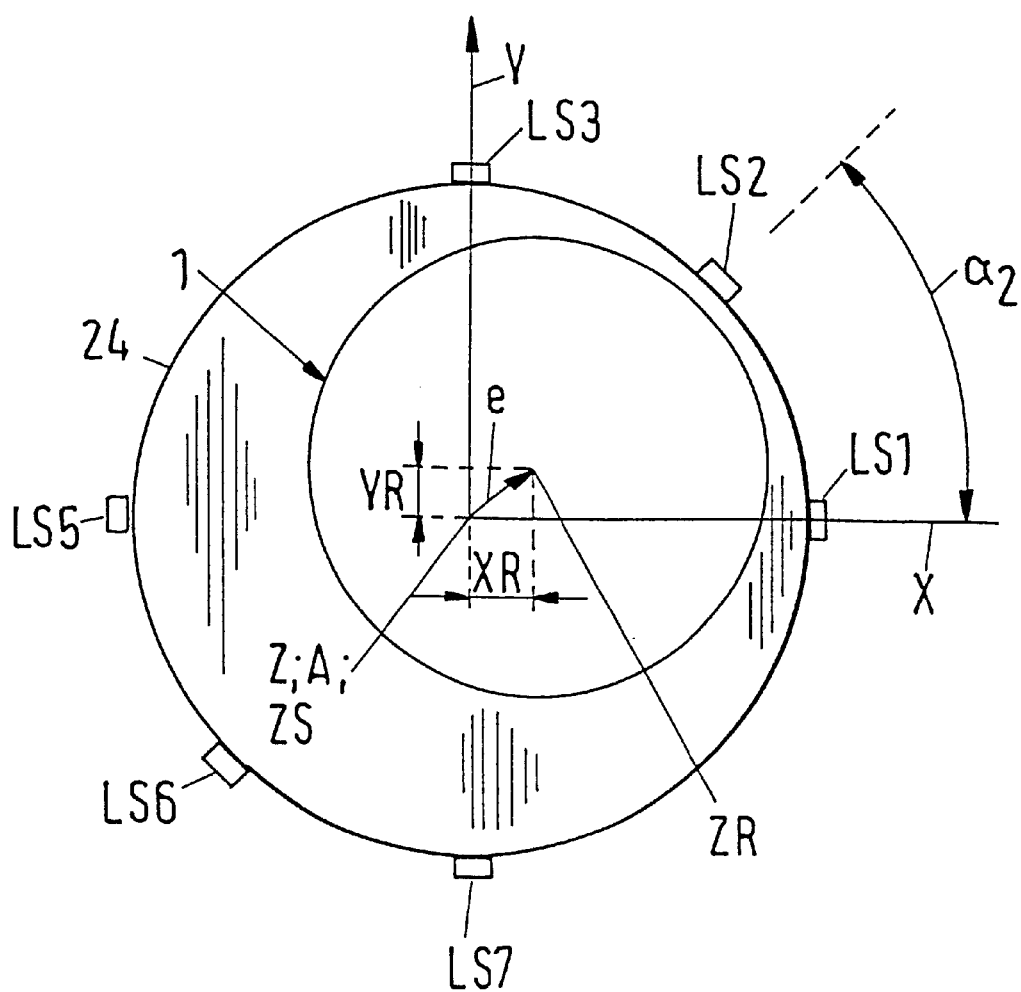

METHOD AND SENSOR ARRANGEMENT FOR THE DETERMINATION OF THE RADIAL POSITION OF A PERMANENT MAGNETIC ROTOR

The invention relates to a method and to a sensor arrangement for the determination of the radial position of a permanent magnetic rotor in an electromagnetic rotary drive which is designed as a bearing-free motor in which the magnetic flux of the permanent magnetic rotor is first determined and thereafter actively measured with respect to placed sensors to support and drive the rotor with respect to the stator.

BACKGROUND OF THE INVENTION

A bearing-free motor with a permanent magnetic rotor is an electromagnetic rotary drive which comprises a permanent magnetically excited rotor and a stator, with the rotor being journalled without contact by means of magnetic forces. The characteristic to which the bearing-free motor owes its name is that it has no separate magnetic bearing for the rotor. For this the stator is designed as a bearing and drive stator and the rotor as a passive magnetic rotor which serves both as a bearing rotor and as a drive rotor. The stator is designed or provided with electrical windings respectively in such a manner that it produces an electromagnetic rotary field which exerts, on the one hand, a torque on the rotor which drives its rotation about the axis of rotation and which, on the other hand, exerts a transverse force on the rotor which can be set in any manner desired so that its radial position with respect to a plane perpendicular to the axis of rotation can be predetermined or actively controlled respectively. Thus in the operating state the rotor can be actively controlled and driven respectively by means of the electric windings of the stator with respect to three degrees of freedom, namely the rotation about the axis of rotation and the radial position in the plane perpendicular to the axis of rotation (two degrees of freedom).

With respect to three further degrees of freedom, namely tiltings with respect to the plane perpendicular to the axis of rotation (two degrees of freedom) and the axial position the rotor is passively magnetically stabilised, that is, not in a controllable manner, by reluctance forces. Thus in the operating state the rotor can be both driven and journalled without contact through the magnetic interaction between the bearing/drive stator and the rotor without separate magnetic bearings being present for this.

The term "bearing-free motor with a permanent magnetic rotor" is to be understood in this sense for the following explanations. With respect to further details of the design and of the excitation and regulation respectively of the bearing-free motor, reference is made here to U.S. Pat. No. 6,100,618.

In U.S. Pat. No. 6,100,618 a bearing-free motor of this kind is disclosed in the example of a rotation pump. In the latter the rotor of the bearing-free motor is provided with vanes and thus forms an integral rotor, which means that it takes over the function of the rotor of the pump in addition to the function of the rotor of the electric motor. Pumps of this kind are advantageous in particular for those uses in which the fluid to be forwarded must not be contaminated, for example for the forwarding of biological liquids such as blood or highly pure liquids such as purest water. In addition rotation pumps of this kind are suitable for the forwarding of aggressive liquids which would destroy mechanical bearings a short time.

In comparison with conventional pumps with a magnetically journalled rotor, pumps of this kind, which operate in accordance with the principle of the bearing-free motor, have the advantage of being extremely compact and space saving and nevertheless having all the advantages of the non-contact magnetic journalling of the rotor even at high performance or forwarding power respectively. This is one of the reasons why pumps of this kind are suitable among other things as blood pumps for uses inside and outside the body.

For the operation of a bearing-free motor with a permanent magnetically excited rotor, in particular for the active regulation of the position of the rotor, which usually takes place by means of a vector regulation method or a field oriented regulation method respectively, it is necessary to know the momentary position of the rotor, that is, its position relative to a plane which is perpendicular to the axis of rotation of the rotor, namely X-Y plane of the stator system. Different possibilities for this are suggested in U.S. Pat. No. 6,100,618. An eddy current distance sensor can be provided in order to measure the distance to a conducting layer which is integrated in the rotor, or optical sensors can be used for the determination of the radial position of the rotor. As further alternatives it is proposed to arrange eight flux probes in the air gap between the rotor and the stator and to determine the radial position of the rotor through weighted summation of the partial fluxes which are measured with the help of the flux probes in each case over half the periphery in the X direction and in the Y direction as well as in each case in the opposite direction, taking of the absolute value and subsequent formation of the difference of the components belonging to the X direction and the opposite direction and, respectively, belonging to the Y direction and the opposite direction.

The present invention deals with the object of proposing another method and another sensor arrangement by means of which the radial position of a permanent magnetic rotor in a bearing-free motor can be reliably determined in a simple manner, economically and with as little cost and complexity as possible.

SUMMARY OF THE INVENTION

In accordance with the invention a method for the determination of the radial position of a permanent magnetic rotor in an electromagnetic rotary drive which is designed as a bearing-free motor with a stator and the magnetically journalled rotor is thus proposed in which the magnetic flux which is produced by the rotor is determined by means of sensors in the space between the rotor and the stator at least at two different measurement locations. The radial position of the rotor is determined with the help of the magnetic flux which is determined at the measurement locations and with the help of the magnetic flux which results at the measurement locations when the rotor is arranged so as to be centered.

Since that magnetic flux is used for the determination of the radial position of the rotor which the rotor produces at the measurement locations when it is centered with respect to its radial position, it is sufficient even in an eccentric position of the rotor to determine the flux that it produces at two different measurement locations in the space between the stator and the rotor to establish the radial position of the rotor. Thus fewer sensors for the determination of the magnetic flux are required for the establishment of the momentary radial position of the rotor than e.g. for the solution proposed in U.S. Pat. No. 6,100,618. Consequently the method in accordance with the invention is simpler in particular in regard to the complexity of the apparatus and thus also more economical. In addition the method in accordance with the invention is also significantly less complicated and expensive with respect to the signal processing and evaluation required without it being necessary to make concessions on the reliability of the position determination. The method in accordance with the invention furthermore has the advantage of being very flexible, since it is suitable at least for all patterns of the rotor magnetisation which are relevant in practice. Also, the number of pole pairs of the permanent magnetic rotor is subject to no restriction.

BRIEF DESCRIPTION OF THE DRAWINGS

In those embodiments of the rotor in particular in which the rotor magnetisation has zero crossings the magnetic flux in the space between rotor and the stator is preferably measured at three different measurement locations which are chosen in such a manner that for an arbitrary rotor angle the angular position of at least two of the measurement locations is different from the angular position of the zero crossings of the rotor magnetisation.

In accordance with a preferred embodiment of the method in accordance with the invention the magnetic flux is in addition determined in the space between the rotor and the stator at those locations and used for the establishment of the radial position of the rotor which are displaced by 180° with respect to the measurement locations when viewed in the direction of rotation of the rotor. Through this measure, systematic errors such as common mode disturbances, offsets and thermal drifting can be compensated.

Figure 3:
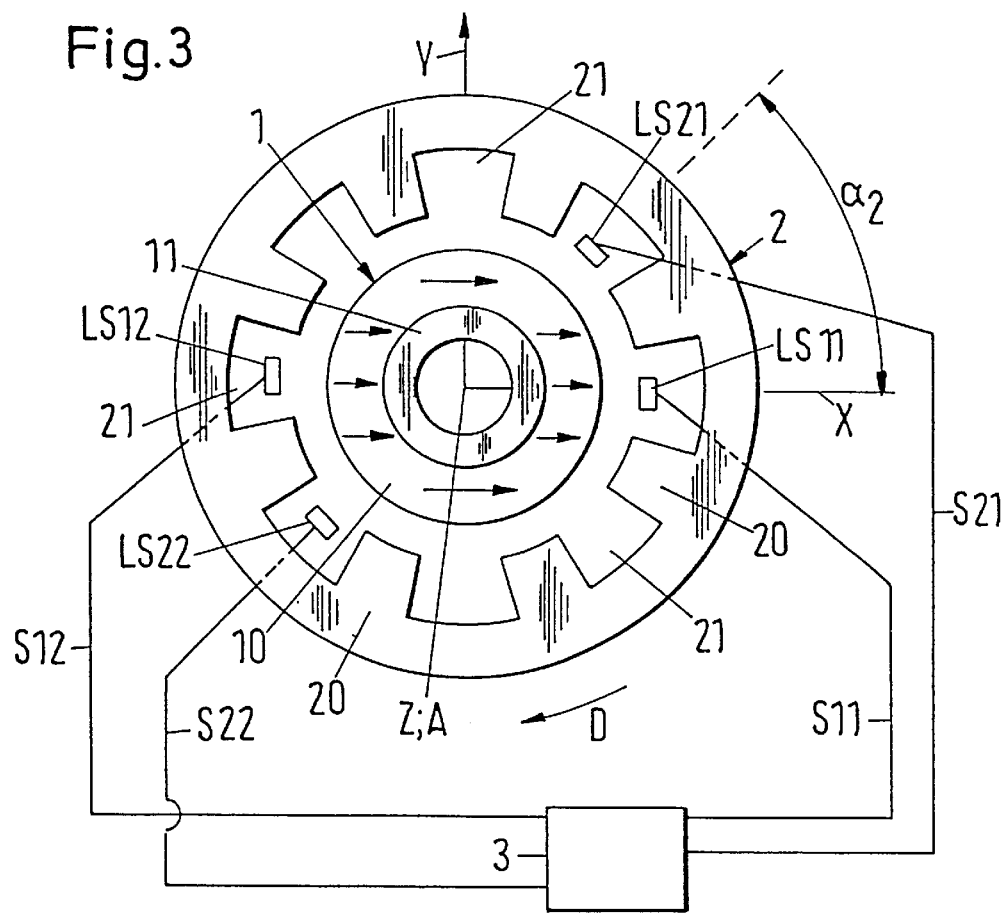

The sensor arrangement in accordance with the invention for the determination of the radial position of a permanent magnetic rotor in an electromagnetic rotary drive which is designed as a bearing-free motor with a stator and the magnetically journalled rotor comprises at least two sensors for the determination of the magnetic flux which is produced by the rotor in the space between the rotor and the stator at least at two different measurement locations. Furthermore, an evaluation unit is provided which can determine the radial position of the rotor with the help of the magnetic flux which is determined at the measurement locations and with the help of the magnetic flux which results at the measurement locations when the rotor is arranged so as to be centered.

This sensor arrangement analogously has the same advantages as the method in accordance with the invention. For the already mentioned reasons the following measures are also advantageous for the sensor arrangement in accordance with the invention:

Three sensors are arranged in such a manner that the evaluation unit can determine the radial position of the rotor with the help of the magnetic flux at the three associated measurement locations for each rotor angle desired.

At least three sensors are provided which are arranged in such a manner that the magnetic flux can be determined with them in the space between the rotor and the stator at three different measurement locations, the position of which is such that for an arbitrary rotor angle the angular position of at least two measurement locations is different from the angular position of the zero crossings of the rotor magnetisation.

Each sensor comprises two sensor elements which are arranged so as to be displaced with respect to one another by 180° in the direction of rotation of the rotor with respect to the desired axis of rotation of the rotor, which thus lie pair-wise oppositely with respect to the desired axis of rotation.

Normally the stator of a bearing-free motor with a permanent magnetically excited rotor comprises a plurality of stator teeth which extend radially in the direction towards the rotor. The sensors are then preferably arranged in each case in a gap between two adjacent stator teeth. Through this measure the magnetic control flux which flows through the stator teeth for the control of the radial position is not also measured. Furthermore, no sensors are thereby required in the air gap between the stator teeth and the rotor, so that this air gap can be designed smaller or narrower respectively, which has a very positive effect on the magnetic coupling between the stator and the rotor.

The rotor of the bearing-free motor is preferably designed to be disc or ring shaped. Naturally other geometries of the rotor, for example also bell shaped ones, are also possible in principle.

Further advantageous measures and preferred embodiments of the subjects of the invention result from the subordinate claims.

Figure 4:
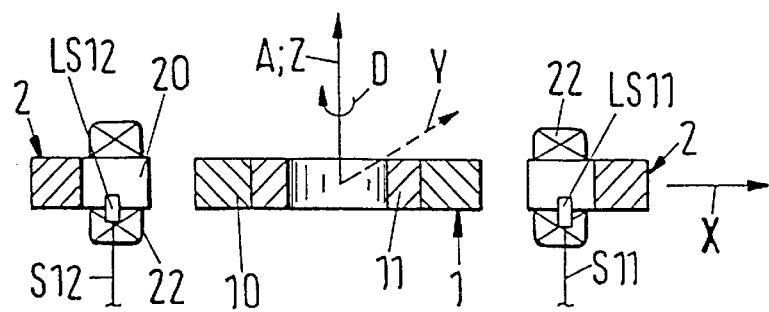
Figure 5:
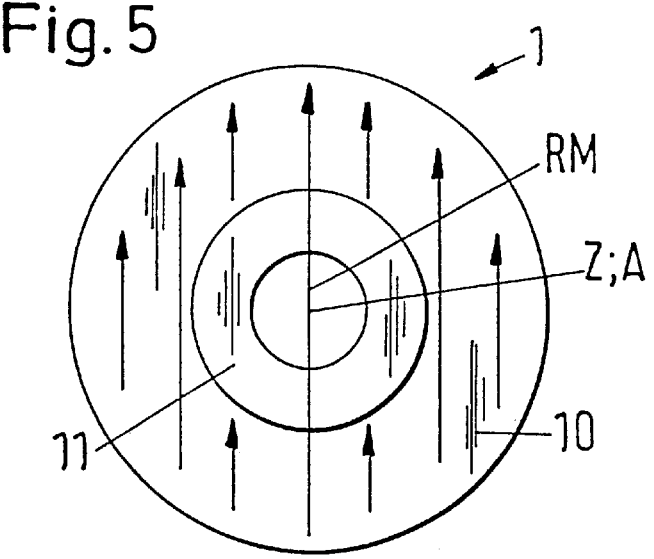
Figure 6:
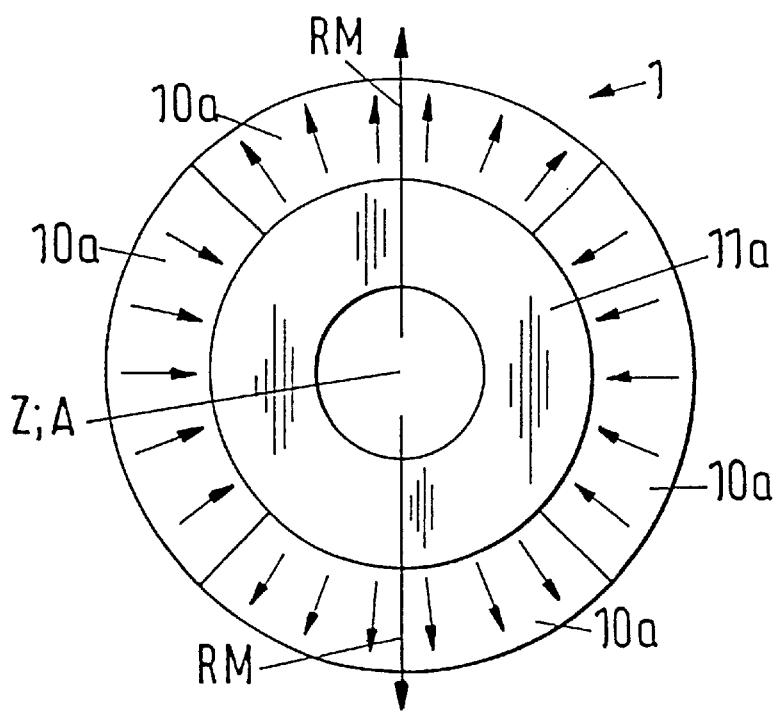
Figure 7:
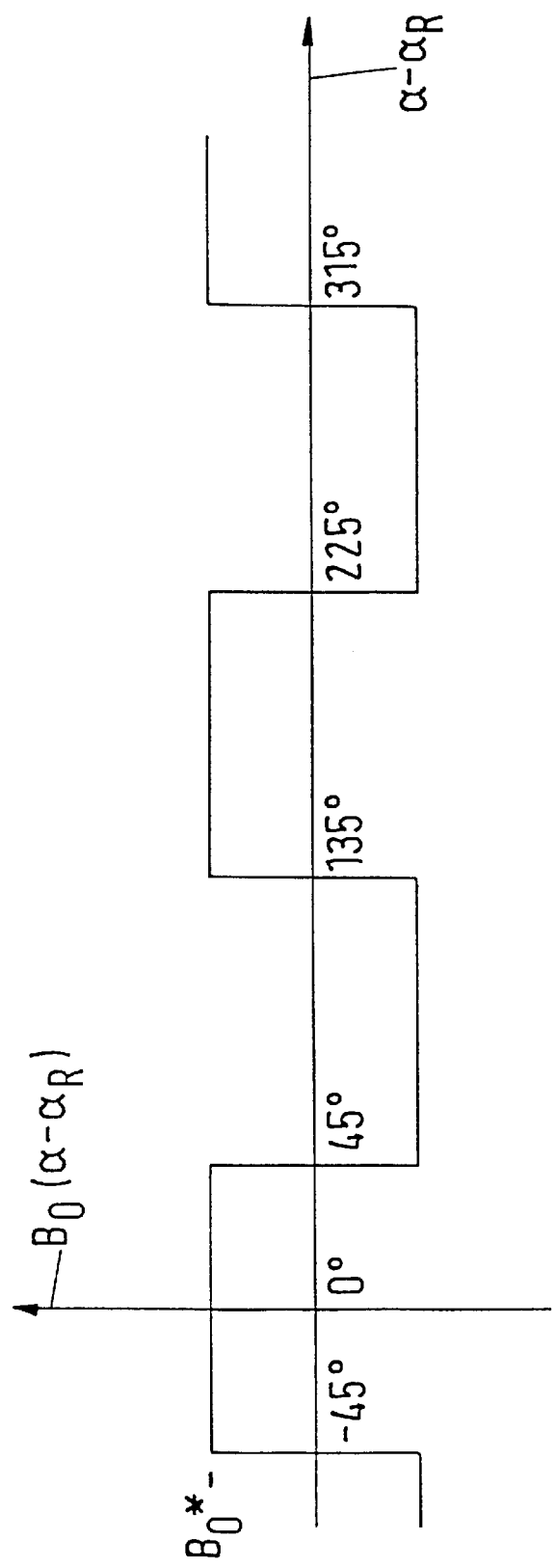
Figure 8:
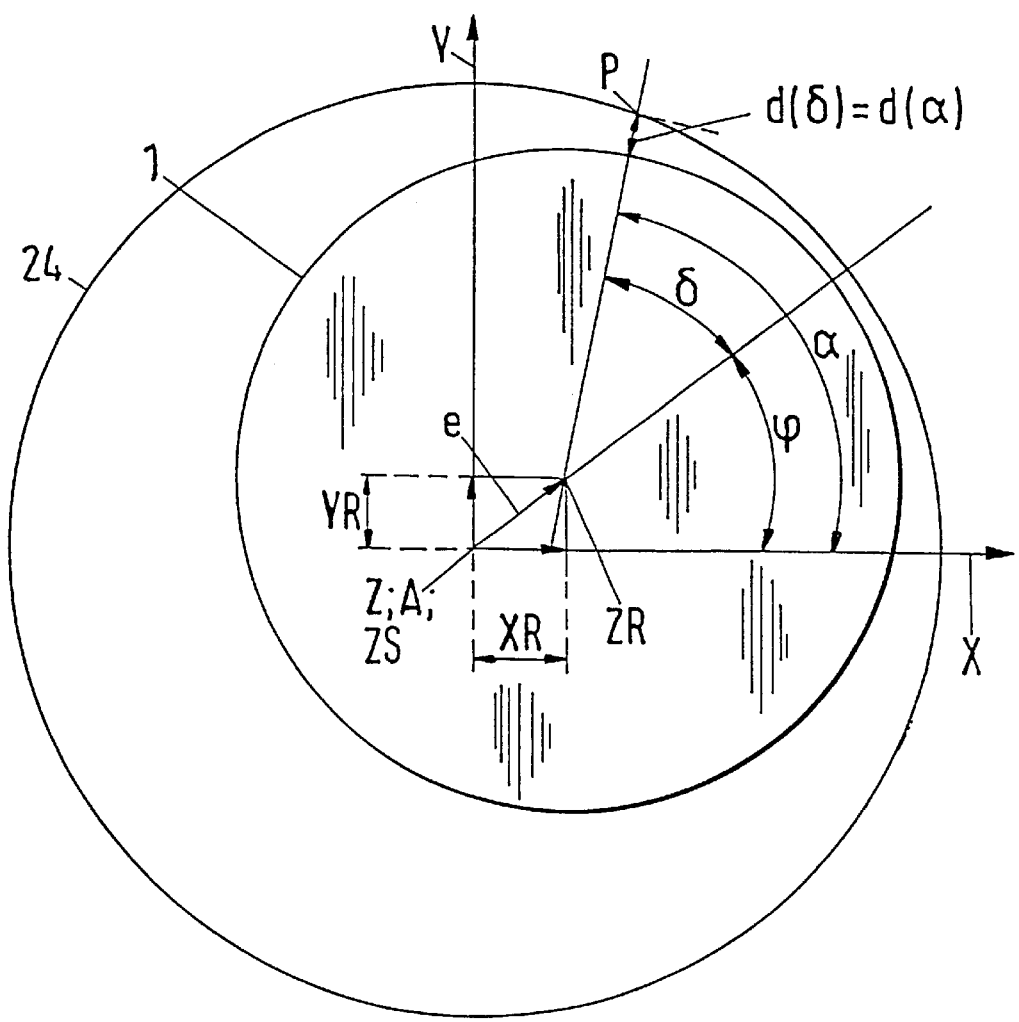
Figure 9A:
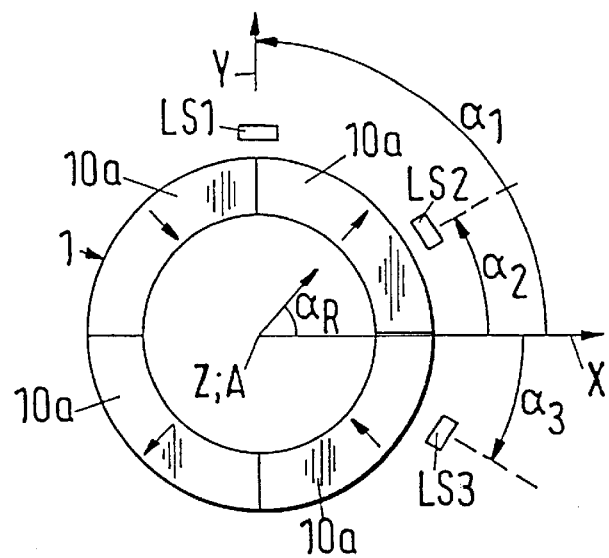
Figure 9B:
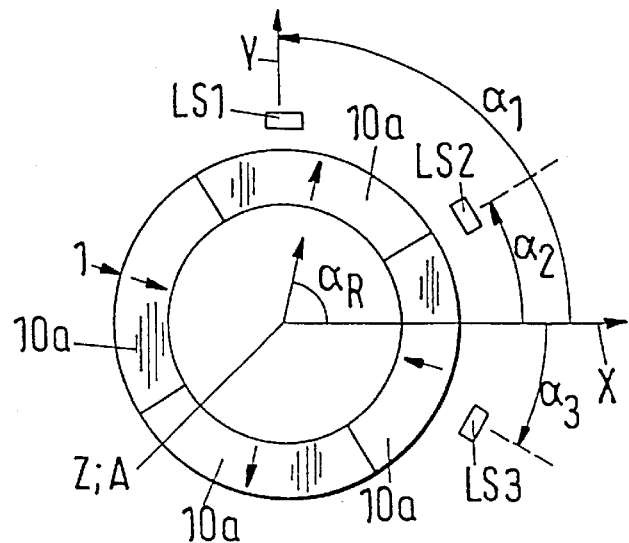
Figure 9C:
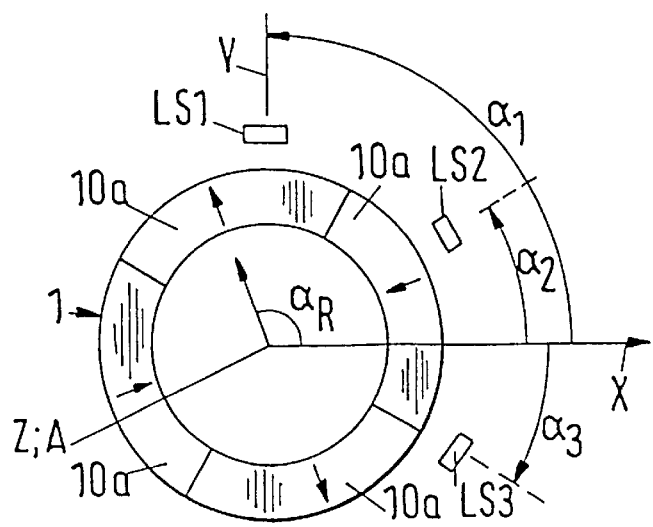

The invention will be described in more detail in the following, both in relation to the aspects of the apparatus and of the technology of the method, with reference to exemplary embodiments and with reference to the drawings. In the drawings, parts which are identical or have equivalent functions are provided with the same reference symbol. Shown in the schematic drawings, which are not to scale, are:

FIG. 1 is a plan view of essential parts of a bearing-free motor with a permanent magnetically excited rotor and with an exemplary embodiment of the sensor arrangement in accordance with the invention, FIG. 2 is a section through the bearing-free motor of FIG. 1 along the line II—II in FIG. 1, FIG. 3 is a view similar to FIG. 1, but for a variant of the exemplary embodiment of the sensor arrangement in accordance with the invention, FIG. 4 is a section such as FIG. 2, but for a further variant, FIGS. 5, 6 are respective symbolic illustrations of the rotor magnetisation for different embodiments and magnetisations of the rotor, FIG. 7 is an illustration of the flux distribution function for a rotor which is quadrupolarly magnetised in a block pattern when the rotor is arranged to be centered, FIG. 8 is an illustration for the clarification of the definition of several angles and distances in the stator system, FIGS. 9A, 9B, and 9C are respective illustrations of a possible arrangement of the sensors for a second exemplary embodiment with three sensors (stator not illustrated), and FIG. 10 is a representation of a possible arrangement of the sensors for a third embodiment with six sensors (stator not illustrated).

DESCRIPTION OF THE PREFERRED EMBODIMENTS

It was already explained initially what is to be understood by a bearing-free motor with a permanent magnetic rotor in the framework of this discussion. FIG. 1 shows in a plan view essential parts of a possible design of an electromagnetic rotary drive of this kind and an exemplary embodiment of the sensor arrangement in accordance with the invention. FIG. 2 shows this bearing-free motor in a section along the line II—II in FIG. 1. The bearing-free motor has a permanent magnetic, here ring-shaped, rotor 1 which can be rotated about an axis of rotation A and which is journalled without contact by means of magnetic forces in a stator 2.

The direction of rotation of the rotor 1 is indicated by the arrow D. The rotor 1, which is ring-shaped here, comprises a bipolar permanent magnetic ring 10 (number of pole pairs one), the magnetisation of which is indicated by the arrows without reference symbols, and an iron yoke 11 which is arranged to lie radially inwardly with respect to the permanent magnetic ring 10. The stator 2 has a plurality of stator teeth 20 which extend radially in the direction towards the rotor 1 with gaps 21 lying between them. Electrical windings 22 which are not illustrated in FIG. 1 and are indicated in FIG. 2 are wound around the stator teeth 20.

In accordance with the principle of the bearing-free motor the stator 2 is designed as a bearing and drive stator, which means that no separate magnetic bearing apparatus for the rotor 1 is provided. For this the electric windings 22 of the stator 2 comprise for example—as is disclosed in the already cited U.S. Pat. No. 6,100,618—a drive winding with a number of pole pairs p and a control winding with the number of pole pairs p±1 by means of which an electromagnetic rotary field can be produced which exerts both a driving torque and a transverse force which can be set as desired on the rotor 1. The permanent magnetic rotor 1 can thus be actively controlled or regulated respectively with respect to three degrees of freedom, namely the rotation about the axis of rotation A and its radial position with respect to a plane which is perpendicular to the axis of rotation (two degrees of freedom) and is passively magnetically stabilised through reluctance forces with respect to three further degrees of freedom, namely its axial deflection in the direction of the axis of rotation and tiltings with respect to the plane which is perpendicular to the axis of rotation A (two degrees of freedom). The supply, control and regulation devices required for this are not illustrated here for the sake of clarity.

Usually two coordinate systems are used for the description of the bearing-free motor, in particular for its mathematical description, namely the stator system and the rotor system, which are defined as follows.

The stator system is a Cartesian coordinate system with the coordinate axes X, Y, Z which is stationary with respect to the stator 2, and the origin of which lies in the centre of the stator 2, which means at the geometrical midpoint of the space which is surrounded by the stator 2. The Z axis points in accordance with its definition in the direction of the desired axis of rotation A of the rotor 1, by which is meant that axis of rotation about which the rotor 1 rotates in the operating state when it is in an exactly centered position with respect to the stator 2, as is illustrated in FIG. 1. In FIG. 1 the Z axis of the stator system is perpendicular to the plane of the drawing. The definition of the X and Y axes in the plane which is perpendicular to the Z axis and which contains the origin is arbitrary. The X-Y plane which is spanned by the X and the Y axis is consequently the plane in which the rotor 1 normally rotates during operation, which means in the event that it is not tilted or axially deflected.

The rotor system is likewise a Cartesian co-ordinate system with the coordinate axes X', Y', Z' (not illustrated), which however is stationary with respect to the rotor 1. Its origin lies at the geometrical centre of the rotor 1, and is thus identical with the origin of the stator system when the rotor 1 is centered in the stator 2 with respect to the axial position (referred to the Z axis) and the radial position (referred to the X-Y plane). The Z' axis of the rotor system is defined by the axis of rotation about which the rotor 1 rotates; the definition of the X' and the Y' axes is again arbitrary. If the rotor 1 is exactly centered with respect to the stator 2 and rotates tilt-free—that is, about its desired axis of rotation A—during operation, the axis of rotation is the same as the desired axis of rotation A. Thus the Z axis of the stator system and the Z' axis of the rotor system coincide and the X' and the Y' axes of the rotor system rotate about this common Z axis.

In the following, by the term "axial direction" is meant the direction of the desired axis of rotation A, which is identical to the direction of the Z axis of the stator system. By "axial position" is meant the position with respect to the axial direction and by "radial position" is meant the position with respect to the X-Y plane of the stator system. In the following the concept of the rotor angle is used for the description of the angular position of the rotor 1 in the X-Y plane. The latter specifies the (momentary) angle between the X' or Y' axis respectively of the rotor system, which is stationary with respect to the rotor 1, and the X or Y axis respectively of the stator system, which is stationary with respect to the stator 2. Let it be agreed on without a restriction of the generality that for the rotor angle zero the rotor 1 is oriented in the stator 2 in such a manner that the X' axis of the rotor system coincides with the X axis of the stator system.

FIGS. 1 and 2 furthermore show an exemplary embodiment of the sensor arrangement in accordance with the invention for the determination of the radial position of the permanent magnetic rotor 1. Two sensors LS1 and LS2 are provided in order to determine the magnetic flux produced by the rotor 1 at two different measurement locations in the space between the rotor 1 and the stator 2. By this space between the rotor 1 and the stator 2 is meant both the gaps 21 between the stator teeth 20 and also the air gap between the stator teeth 20 and the rotor 1. The sensors LS1, LS2 are here both arranged in the X-Y plane of the stator system. They are placed in the stator system at locations which are in each case described by a polar angle $\alpha_i$ (i=1, 2) which is measured from the X axis of the stator system, which means that the associate measurement locations are defined by the angle $\alpha_i$. In the exemplary embodiment described here the sensor LS1 lies on the X axis, which means at $\alpha_1=0$, and the sensor 2 lies at $\alpha_2=45°$. All sensors which are known per se can be used as position sensors LS1, LS2 for the determination of the magnetic flux, such as e.g. magnetic field probes, Hall sensors, magneto resistive probes or giant magneto resistive (GMR) sensors.

The sensors LS1, LS2 are preferably—as FIG. 1 or FIG. 2 respectively shows—arranged in each case in a gap 21 between two adjacent stator teeth 20 because through this measure the magnetic control flux which flows through the stator teeth 20 for the controlling of the rotor position is not also measured by the sensors LS1, LS2. In addition, through this measure the air gap between the stator teeth 20 on the one hand and the rotor 1 on the other hand can be designed smaller, which has a positive effect on the magnetic coupling between the stator 2 and the rotor 1. In principle it is naturally also possible to attach the position sensors LS1, LS2 in each case on the radial inner ends of a stator tooth 20.

The sensors LS1 and LS2 are connected via signal lines S1, S2 to an evaluation unit 3 to which they transmit the signals which they measure. The evaluation unit 3, which can be integrated into one of the supply, control and regulation unit devices, determines, with the help of the current magnetic flux which is determined at the measurement locations and with the help of that flux which results at the measurement locations when the rotor 1 is centrally arranged, the momentary radial position of the rotor 1 and transmits it for example to a non-illustrated regulation device for the regulation of the radial position. Further below it will be explained how the evaluation unit 3 can determine the radial position of the rotor 1.

FIG. 3 shows, in an illustration which is analogous to FIG. 1, a variant of the sensor arrangement of FIG. 1. In this variant each sensor LS1 and LS2 respectively comprises in each case two sensor elements LS11, LS12 and LS21, LS22 respectively, with the sensor elements LS11 and LS12 or, respectively, LS21 and LS22 belonging to the same sensor LS1 or LS2 respectively being arranged with a displacement in the direction of rotation D of 180° with respect to the desired axis of rotation A of the rotor, hence diametrically opposite to one another with respect to the Z axis, or expressed differently: If the one sensor element is arranged at $\alpha_i$ with i=1, 2, then the other sensor element belonging to the same sensor is arranged at $\alpha_i+180°$. With an arrangement of this kind systematic errors such as offset voltages, thermal drifting and common mode disturbances can be compensated, for example in that the difference signal of the two sensor elements belonging to the same sensor is used in each case for the determination of the radial position of the sensor. The sensor elements LS11, LS12, LS21, LS22 are connected via signal lines S11, S12, S21, S22 to the evaluation unit 3.

FIG. 4 shows, in a sectional illustration analogous to FIG. 2, a further variant which consists in not arranging the sensors LS1, LS2 or the sensor elements LS11, LS12, LS21, LS22 respectively in the X-Y plane but rather displaced with respect to the latter, for example in such a manner that the sensors or the sensor elements respectively partially protrude in the axial direction out of the stator 2 or out of the air gap between the stator 2 and the rotor 1 respectively. This variant has the advantage that a deflection of the rotor 1 with respect to the axial direction can also be determined.

With respect to the concrete embodiment of the permanent magnetic rotor 1, in particular its number of pole pairs and the pattern of its magnetisation, there are numerous possibilities, of which only two shall be explained here with exemplary character.

FIGS. 5 and 6 show in each case a plan view of the permanent magnetic rotor 1; the arrows without reference symbols symbolically indicate the distribution of the magnetisation of the rotor 1; the arrow designated with the reference symbol RM symbolically represents the direction of the resulting rotor magnetisation.

The rotor magnetisation can usually be described characteristically by a flux distribution function. The latter specifies substantially the magnetic flux which is produced by the permanent magnetic rotor 1 in the air gap between the stator 2 and the rotor 1 in dependence on an angular variable. This shall be clarified with an example. If for example the rotor is magnetised sinusoidally, then this means that the flux distribution function is a sine function. If one measures the magnetic flux produced by the permanent magnetic rotor 1 for a rotor magnetisation of this kind at a fixed location with respect to the stator system in the space between the rotor 1 and the stator 2, e.g. at one of the measurement locations which belong to the sensors LS1, LS2, and rotates the rotor 1 by 360° about the desired axis of rotation A, then the thus measured magnetic flux is a sine function of the rotor angle.

FIG. 5 shows a ring-shaped embodiment of the rotor 1 with a permanent magnetic ring 10 and an iron yoke 11 which is arranged to lie radially inwardly with respect to the ring 10. This rotor 1 is bipolarly (number of pole pairs 1), sinusoidally magnetised, which means that the flux distribution function for this rotor 1 is a sine function which has the same periodicity as the geometric rotor angle, which means that for one rotation of the rotor 1 one period of the flux distribution function is run through. The direction of the rotor magnetisation is symbolically illustrated by the arrow RM. This embodiment of the rotor 1 corresponds to the rotors illustrated in FIGS. 1 to 4.

FIG. 6 shows a ring-shaped embodiment of the rotor 1 with four permanent magnetic ring segments 10a which are arranged to lie adjacently in the peripheral direction in such a manner that they form a ring. Radially inwardly disposed with respect to this ring a ring-shaped iron yoke 11c is provided. Each ring segment 10a is homogeneously radially magnetised, with adjacent ring segments 10a in each case being magnetised in the opposite direction, which means that the ring segments 10a are alternatingly magnetised radially outwardly and radially inwardly. This embodiment is a rotor 1 which is quadrupolarly (number of pole pairs two) magnetised in a block pattern or in rectangular pattern. The flux distribution function is a rectangular function which runs through its period twice for a complete rotation of the rotor. The direction of the rotor magnetisation RM is no longer unique, as is indicated by the two arrows RM. The associated flux distribution function Bo is illustrated in FIG. 7 in dependence on the angular difference $\alpha - \alpha_R$, with a as a running variable specifying the polar angle of an arbitrary point in the space between the stator 2 and the rotor 1 measured from the X axis and CR the rotor angle. The index "0" in $B_0$ indicates that this flux distribution function holds for the case that the rotor 1 is centered with respect to its radial and its axial position in the stator 2.

Since the pattern of the rotor magnetisation is known in the concrete application, the flux distribution function Bo for the rotor 1, which is arranged so as to be centered, is also known.

Naturally other geometries and magnetisations of the rotor than those described here are also possible, for example also disc or bell shaped rotors, or those with higher numbers of pole pairs and/or qualitatively different flux distribution functions, e.g. trapezoidal magnetisations.

In the operation of a bearing-free motor with a permanent magnetically excited rotor it is usually necessary to know or to determine respectively the momentary direction or position of the rotor magnetisation in the stator system and thus the geometrical rotor angle, for example for the drive regulation, which is typically carried out by means of a vector regulation or a field oriented regulation respectively. Methods for its determination are for example disclosed in the already cited U.S. Pat. No. 6,100,618 so that these parameters can be assumed to be known for the following. The methods disclosed in U.S. Pat. No. 6,100,618 will not be explained in further detail here. It should however be mentioned that the sensors LS1, LS2 of the sensor arrangement in accordance with the invention can also be used for the determination of the momentary position of the rotor magnetisation with respect to the stator system depending on the concrete form of the rotor magnetisation.

Alternatively to the methods described in U.S. Pat. No. 6,100,618 it is also possible to determine the direction of the rotor magnetisation with respect to the stator system by means of magnetic field sensors which are arranged with a displacement in the axial direction with respect to the rotor 1 and stationarily with respect to the stator system and which measure the stray field, in particular the axial stray field, of the permanent magnetic rotor. With these magnetic field sensors for example at least two partial fluxes of the stray field are measured. The partial fluxes are determined in at least two different directions which lie parallel to the X-Y plane. From the partial fluxes the position of the rotor magnetisation can then be established mathematically, for example by means of a trigonometric analysis or via a comparison with an electronically stored look-up table. The measurement in the stray field, in particular in the axial stray field, of the rotor 1, has the advantage that the axial position of the rotor 1 can also be determined from a measurement of this kind because for example the amplitude or the magnitude respectively of the axial stray field is dependent on the axial distance from the rotor 1. This dependence can be measured by measurement technology and stored so that the axial position of the rotor 1 can be determined during the operation of the bearing-free motor with reference to a comparison of the measured amplitude or of the measured magnitude of the axial stray field with the stored values.

Naturally it is also possible to provide suitable separate sensors for the determination of the axial position of the rotor.

Since it is not essential for the understanding of the present invention in accordance with which method the position or the direction respectively of the rotor magnetisation with respect to the stator system is determined, it will be assumed for the following for the sake of simplicity that the momentary position of the rotor magnetisation in the stator system is known.

For unique rotor magnetisations (see FIG. 5) the geometrical rotor angle is then also known at the same time; for non unique rotor magnetisations (see FIG. 6) two rotor angles which differ by 180° or in general by a plurality of rotor angles belong to each position of the rotor magnetisation with respect to the stator system. This involves no restriction in practice however since these two or more rotor angles belong to magnetically equivalent angular positions of the rotor 1 in the stator 2 so that with the direction of the rotor magnetisation in the stator system the geometric rotor angle is also de facto known for non-unique rotor magnetisations.

The determination of the radial position of the rotor 1 in the stator 2 through the evaluation unit 3 takes place with the help of the magnetic flux determined by means of the sensors LS1, LS2 and with the help of that magnetic flux which results at the measurement locations when the rotor is arranged centrally. The latter parameter can also be determined without an additional measurement because, on the one hand, the pattern of the rotor magnetisation and thus the flux distribution function $B_0$ for the centrally arranged rotor is known for an arbitrarily magnetised given permanent magnetic rotor 1, and, on the other hand, the momentary position of the rotor magnetisation in the stator system or the rotor angle $\alpha_R$ respectively is known. Before it is now explained in more detail how the determination of the radial position of the rotor 1 can take place, several parameters will first be defined or explained respectively with reference to FIG. 8. Since it is sufficient for the understanding, it will be assumed in the following for the sake of simplicity that the rotor 1 is not deflected with respect to the axial direction, and is thus located in the X-Y plane of the stator system. A deflection of the rotor 1 in the axial direction which may be present can however be taken into account in a simple manner.

In FIG. 8 the rotor 1 is illustrated by the inner circular line. The outer circular line represents the radial outer boundary 24 of the air gap between the rotor 1 on the one hand and the stator teeth 20, which are not illustrated in FIG. 8, on the other hand, which means that the stator teeth 20 reach, coming from the outside, up to the radial outer boundary 24 of the air gap. FIG. 8 shows the rotor 1 in an eccentric position. The centre of the stator 2 is designated by ZS, that is, the origin of the stator system with the co-ordinate axes X, Y, Z. The Z axis is perpendicular to the plane of the drawing. ZR designates the centre of the rotor 1, that is, the origin of the rotor system. If the rotor is centered with respect to its radial position, ZS and ZR coincide. The connection arrow between ZS and ZR describes the radial deflection of the rotor 1 from its centered position. The magnitude of the deflection, that is, the length of the connection arrow, is designated by e, the angle between the deflection of the rotor 1 and the X axis of the stator system by $\phi$. The deflection has the Cartesian coordinates XR and YR in the stator system. These are naturally also the Cartesian coordinates of the centre of the rotor ZR or of the origin of the rotor system respectively measured in the stator system.

The distance of the rotor 1 from the radial outer boundary 24, thus the width of the air gap, is designated by d. The distance d is naturally dependent on the angle in the case of an eccentric position of the rotor 1. The two angular coordinates $\alpha$ and $\delta$ serve as running variables for the angle. If P is an arbitrary point on the radial outer boundary 24 then $\delta$ specifies the angle between the connection line of this point P with the centre ZR of the rotor 1 and the direction of the deflection, which is described by the angle $\phi$; $\alpha$ specifies the angle between the named connection line and the X axis of the stator system. Since for all cases which are relevant in practice the deflection e is very small, $\alpha = \phi + \delta$ to a very good approximation. The error of this approximation is typically less than 0.1° in practice. This means that to a good approximation $\alpha$ is the polar angle of the point P in the X-Y plane of the stator system measured from the X axis. Therefore this angle is also designated by the same symbol $\alpha$ as the polar angle which was already introduced further above and which describes the angular position of the sensors LS1, LS2 or of the measurement locations respectively. The distance between the rotor 1 and the point P on the radial outer boundary 24 is designated by $d(\alpha)$ or $d(\delta)$ respectively. The angularly independent width of the air gap for the centered rotor 1, that is, for the case that ZR=ZS, is designated by $d_0$. This width $d_0$ corresponds to half the difference between the inner diameter of the stator 2 and the outer diameter of the rotor 1. For the distance $d(\alpha)$ or $d(\delta)$ respectively the following relationship holds:

$$d(\alpha)=d_0-e\cdot\cos(\alpha-\phi) \text{ and } d(\delta)=d_0-e\cdot\cos(\delta) \text{ respectively}$$

The magnetic flux distribution in the air gap between the rotor 1 and the stator 2 when the rotor 1 is centered, which means at the deflection e=0, is described by the flux distribution function:

$$B_0(\alpha)=B_0^*\cdot f(\alpha),$$

with $B_0^*$ designating the amplitude and $f(\alpha)$ an angular function of $\alpha$. The index "0" indicates that this flux distribution function holds for the centered rotor 1. This flux distribution function $B_0(\alpha)$ can be determined from the rotor magnetisation function and the rotor angle, which is designated by $\alpha_R$, or, respectively, from the direction of the rotor magnetisation in the stator system. The rotor magnetisation and the rotor angle $\alpha_R$ or the direction of the rotor magnetisation in the stator system respectively are known, so that the flux distribution function $B_0(\alpha)$ can then also be determined. A deflection of the rotor 1 with respect to the axial direction which may be present can be taken into account in the determination of $B_0(\alpha)$.

As an example for a flux distribution function $B_0(\alpha)$ in the air gap when the rotor 1 is centered, FIG. 7 shows such a flux distribution function $B_0(\alpha-\alpha_R)$ for a rotor 1 which is quadrupolarly magnetised in a block pattern (see FIG. 5) as a function of the angular difference $(\alpha-\alpha_R)$, with $\alpha_R$ being the rotor angle measured relative to the X axis.

The flux distribution in the air gap for the eccentric rotor 1 with the deflection e is described by a flux distribution function $B_e(\alpha)$. For this, it holds that:

$$B_e(\alpha)=B_0(\alpha)\cdot d_0/d(\alpha)$$

With a dimensionless eccentricity $\epsilon=e/d_0$, there results:

$$B_e(\alpha)=B_0(\alpha)/[1-\epsilon\cdot\cos(\alpha-\phi)]$$

For $\epsilon<<1$, as a result of a series expansion, it holds that:

$$B_e(\alpha)/B_0(\alpha)\approx 1+\epsilon\cdot\cos(\alpha-\phi)$$

As already mentioned, the two sensors LS1, LS2 are placed in the stator system at locations which are described by the polar angles $\alpha_1$ and $\alpha_2$ (see e.g. FIG. 1), which means that the two different measurement locations are determined by the angles $\alpha_1$ and $\alpha_2$. Thus the value of the flux distribution function $B_e(\alpha)$ for the two angles $\alpha_1$ and $\alpha_2$, namely $B_e(\alpha_1)$ and $B_e(\alpha_2)$, is known as a result of the signals which are measured by the sensors LS1, LS2. As has already been explained the flux distribution function $B_0(\alpha)$ can furthermore be determined for the centered rotor 1 so that the values of this function for the angles $\alpha_1$ and $\alpha_2$, namely $B_e(\alpha_1)$ and $B_e(\alpha_2)$, can also be determined. There thus result the two determining equations:

$$\epsilon\cdot\cos(\alpha_1-\phi)=[B_e(\alpha_1)/B_0(\alpha_1)]-1 \text{ and } \epsilon\cdot\cos(\alpha_2-\phi)=[B_e(\alpha_2)/B_0(\alpha_2)]-1$$

with which the two unknown parameters $\epsilon$ and $\phi$ can be calculated.

Thus the two Cartesian coordinates XR and YR of the deflection and thereby the position of the centre ZR of the rotor 1 are known with respect to the stator system:

$$XR=d_0\cdot\epsilon\cdot\cos(\phi) \text{ and } YR=d_0\cdot E\epsilon\sin(\phi)$$

As a consequence the radial position of the rotor 1 is known with respect to the stator system.

In particular for bipolarly magnetised rotors 1 there results a particularly simple evaluation of the determining equations for the case $\alpha_1=0°$ and $\alpha_2=90°$, which means when the first measurement location lies on the X axis and the second measurement location lies on the Y axis of the stator system.

Patterns of the rotor magnetisation which are realised in practice, e.g. sinusoidal, block shaped or trapezoidal ones, and thereby also the flux distribution functions, often have one or more zero crossings (see e.g. FIG. 7). If now one such zero crossing lies precisely at the same angular position as one of the sensors, for example at $\alpha_1$,—which occurs regularly when the rotor rotates—then the expression $B_e(\alpha_1)/B_0(\alpha_1)$ remains undetermined in the corresponding determining equation so that the parameters $\epsilon$ and $\phi$ can no longer be uniquely determined for this rotor angle. In practice this circumstance does not have a particularly disturbing effect, in particular for bipolarly magnetised rotors, because only for very few special rotor angles $\alpha_R$ does this state arise that one of the determining equations can not or can only with difficulty be evaluated. With a second exemplary embodiment of the invention, which will be described in the following with reference to FIGS. 9A–9C, however this state can be avoided.

In this second exemplary embodiment three sensors LS1, LS2, LS3 are provided, by means of which the magnetic flux in the space between the rotor 1 and the stator 2 can be measured at three different measurement locations. The positions of the sensors LS1, LS2, LS3 or of the measurement locations respectively, described by the angles $\alpha_1$, $\alpha_2$, $\alpha_3$, are arranged in such a manner that the evaluation unit 3 (not illustrated in FIGS. 9A–9C) can determine the radial position of the rotor (1) with the help of the magnetic flux at the three measurement locations for an arbitrary rotor angle $\alpha_R$.

For this, in accordance with the second exemplary embodiment the three sensors LS1, LS2, LS3 are arranged in such a manner that for each rotational angular position of the rotor 1, that is, for each arbitrary rotor angle $\alpha_R$, the angular position $\alpha_1$, $\alpha_2$, $\alpha_3$ of at least two measurement locations is different from the angular position of the zero crossings. The angles between the individual measurement locations are thus chosen in such a manner that at no position of the rotor 1 does more than one zero crossing of the rotor magnetisation or of the flux distribution function respectively coincide with a measurement location. FIGS. 9A–9C show an arrangement of the sensors LS1, LS2, LS3 of this kind in the example of a rotor 1 which is quadrupolarly magnetised in a block pattern (see FIG. 5). In FIGS. 9A–9C the three situations are illustrated in which in each case one of the sensors LS1, LS2, LS3 lies at a zero crossing of the flux distribution function; in the upper figure this is the sensor LS1, in the middle one the sensor LS2, and in the lower one the sensor LS3. It can be recognised that in each illustrated situation, hence for an arbitrary rotor angle $\alpha_R$, two of the sensors LS1, LS2, LS3 do not lie at a zero crossing. The stator 2 and the signal lines are not illustrated in FIGS. 9A–9C.

As a result of the third sensor LS3 or of the third measurement location respectively, which is described by the angle $\alpha_3$, one obtains a third determining equation:

$$\epsilon\cdot\cos(\alpha_3-\phi)=[B_e(\alpha_3)/B_0(\alpha_3)]-1$$

Due to the above named arrangement of the position sensors LS1, LS2, LS3 at least two of the three determining equations can always, which means for an arbitrary rotor angle $\alpha_R$, be evaluated so that the parameters $\epsilon$ and $\phi$ can be uniquely determined for an arbitrary rotor angle $\alpha_R$ with the help of these three position sensors LS1, LS2, LS3 and thus also the radial position of the centre ZR of the rotor 1.

In practice it is advantageous to proceed in such a manner that in each case the two determining equations in which the magnitude of $B_e(\alpha)$ or $B_0(\alpha)$ are the greatest are used for the evaluation.

In the event that all three sensors LS1, LS2, LS3 yield a sufficiently strong signal the system of the three determining equations is overdetermined. This state can be advantageous for the equalisation of the three sensors LS1, LS2, LS3, for example for an offset equalisation, or for the compensation of other systematic errors such as e.g. thermal drifts.

The arrangement of the three position sensors LS1, LS2, LS3 will now be described in detail with reference to the concrete example of a rotor 1 which is quadrupolarly magnetised in a block pattern (see FIG. 5). The associated flux distribution function in the air gap for the centered rotor 1 is illustrated in FIG. 7. The measurement locations, described by the angles $\alpha_1$, $\alpha_2$, $\alpha_3$, are now to be chosen in such a manner that for no rotor angle $\alpha_R$ does more than one of the functional values $B_0(\alpha_1)$, $B_0(\alpha_2)$, $B_0(\alpha_3)$ correspond to a zero crossing. This condition is fulfilled in the event that none of the sensors LS1, LS2, LS3 is arranged so as to be displaced by an angle of k·90° (with k=0, ±1, ±2, ± . . . ) with respect to another position sensor. As a consequence the difference $\alpha_i-\alpha_j$ must be different from k·90° for all i, j=1, 2, 3 and i≠j.

In practice, at $\alpha-\alpha_R$=45°±k·90° (k=0, ±1, ±2, ± . . . ), as shown in FIG. 7, the vertical flanks of the function $B_0(\alpha-\alpha_R)$ are "smeared" over a finite angular region which can be described by an angle $\pm\alpha_S$ about the theoretical flank. Therefore it is advantageous in practice to arrange the sensors LS1, LS2, LS3 in such a manner that for each rotor angle $\alpha_R$ the angular position of at least two measurement locations lies outside this region of $\pm\alpha_S$ as about the zero crossings of the rotor magnetisation or of the flux distribution function respectively. The size of $\alpha_S$ naturally depends on the concrete design of the rotor 1. In the example described here it amounts for example to about 10°.

Taking this smearing into account, the sensors LS1, LS2, LS3 are therefore preferably arranged in such a manner that in the example described here the following relationship holds for the angles $\alpha_1$, $\alpha_2$, $\alpha_3$ of the three measurement locations:

$$k\cdot 90°+\alpha_S<|\alpha_i-\alpha_j|<(k+1)\cdot 90°-\alpha_S$$

with i, j=1, 2, 3; i≠j; k=0, ±1, ±2, ± . . .

Otherwise the angles $\alpha_1$, $\alpha_2$, $\alpha_3$ can in principle be chosen arbitrarily.

It is particularly advantageous, also in regard to a simple evaluation, when the position sensors LS1, LS2, LS3 are arranged in such a manner that the magnitudes of the angle differences $|\alpha_i-\alpha_j|$ are in each case equal to an integral multiple of 60°. An arrangement of this kind is shown in FIG. 9A–9C for the rotor 1 which is quadrupolarly magnetised in a block pattern. In this example of the arrangement, $\alpha_1$=90°, $\alpha_2$=30° and $\alpha_3$=−30°. The zero crossings of the rotor magnetisation function or of the flux distribution function respectively lie in each case at the partition surface between two adjacent permanent magnetic ring segments 10a. FIG. 9A shows the case that the position sensor LS1 lies at a zero crossing, which is the case for the rotor angle $\alpha_R=\alpha_1+45°+k\cdot 90°$. FIG. 9B the position sensor LS2 lies at a zero crossing, which is the case for the rotor angle $\alpha_R=\alpha_2+45°+k\cdot 90°$. FIG. 9C the position sensor LS3 lies at a zero crossing, which is the case for the rotor angle $\alpha_R=\alpha_3+45°+k\cdot 90°$. It can be recognised that in all cases two of the position sensors LS1, LS2 or LS3 are in each case significantly remote from the zero crossings so that at least two of the position sensors LS1, LS2, LS3 always yield an evaluatable signal. Thus for each arbitrary rotor angle $\alpha_R$ the radial position of the rotor 1 with respect to the X-Y plane of the stator system can be determined.

An arrangement of three sensors LS1, LS2, LS3 of this kind, in which for an arbitrary rotor angle $\alpha_R$ at least two of the sensors do not lie at a zero crossing of the flux distribution function, can be found for an arbitrary pattern of the rotor magnetisation and for any number of pole pairs of the rotor 1.

For analogous reasons, as have already been explained above, it is also an advantageous measure for the second exemplary embodiment when each sensor LS1, LS2, LS3 comprises two sensor elements in each case which are arranged with a displacement of 180° in the direction of rotation D of the rotor 1 with respect to the desired axis of rotation A of the rotor or of the Z axis of the stator system respectively. Also in the second exemplary embodiment the sensors or the sensor elements respectively can be arranged in the X-Y plane of the stator system or displaced in the axial direction with respect to the latter.

Furthermore, it is possible to achieve a redundancy or an error tolerance respectively through arrangements with more than three position sensors.

It is self evident that the sensor arrangement in accordance with the invention can naturally also comprise more than three sensors LS1, LS2, LS3 and, respectively, that the method in accordance with the invention can be carried out with more than three sensors LS1, LS2, LS3.

In the following a third embodiment of the sensor arrangement of the invention, i.e. of the method of the invention will be described, which is in particular characterised in that the radial position of the permanent magnetic rotor 1 can be determined without the instantaneous rotor angle $\alpha_R$ having to be explicitly known. This third embodiment is in particular suitable for sinusoidally magnetised rotors (see for example FIG. 5), with it in principle being unimportant which pole pair number the rotor 1 has. For the sake of simplicity it is for example assumed that the pole pair number of the rotor 1 is equal to 1. The magnetic flux distribution in the air gap between rotor 1 and stator 2 with the centred rotor 1 can be described for such a two pole sinusoidally magnetised rotor 1 by the following flux distribution function:

$$B_0(\alpha)=B_0^*\cdot\cos(\alpha_R-\alpha)$$

In this connection $\alpha R$ designates, as already explained earlier, the actual rotor angle, $\alpha$ the running variable and $B_0^*$ the amplitude.

In this third embodiment a total of six sensors or sensor elements LS1, LS2, LS3, LS5, LS6, LS7 are provided with which the magnetic flux produced by the rotor 1 in the space between the rotor 1 and the stator 2 can be determined at six different measurement positions. The sensors LS1, LS2, LS3, LS5, LS6, LS7 are each connected to the evaluation unit 3. A possible arrangement of the six sensors is shown in FIG. 10. The sensors are placed in the stator system at locations which are described by the polar angle $\alpha_i$ with i=1,2,3,5,6,7. In the embodiment described here $\alpha_1$=0°; $\alpha_2$=45°; $\alpha_3$=90°; $\alpha_5$=180°; $\alpha_6$=225° and $\alpha_7$=270°, that is to say in each case two of the sensors LS1, LS2, LS3, LS5, LS6, LS7 are arranged diametrically opposite to one another. The sensors can be arranged analogously to the arrangement shown in FIG. 2 in each case in the X-Y plane of the stator system. However, the sensors are preferably arranged somewhat above or below the X-Y plane, analogously to that shown in FIG. 4, i.e. axially displaced relative to the X-Y plane, because in this way tilted positions of the rotor 1 can be more simply compensated from a technical regulating viewpoint.

FIG. 10 shows the rotor 1 in an eccentric position. While retaining the nomenclature already introduced earlier, the radial position of the rotor 1 in the stator system is known when the Cartesian coordinates XR and YR of the centre ZR of the rotor 1 in the stator system are found.

As was already explained earlier, the flux distribution in the air gap for the eccentric rotor with the deflection e is described by a flux distribution function $B_e(\alpha)$ for which applies:

$$B_e(\alpha)=B_0(\alpha)/[1-\epsilon\cdot\cos(\alpha-\phi)],$$

with the dimensionless eccentricity $\epsilon=e/d_0$. For $\epsilon\ll 1$ the following results for the above named flux distribution function $B_0(\alpha)$:

$$B_e(\alpha)\approx B_0^*\cdot\cos\ (\alpha_R-\alpha)\cdot(1+\epsilon\cdot\cos(\phi-\alpha)$$

$$=B_0^*\cdot\cos\ (\alpha_R-\alpha)+0.5\ B_0^*\cdot\epsilon\cdot\cos(\alpha_R+\phi-2\alpha)+0.5\ B_0^*\cdot\epsilon\cdot\cos(\alpha_R-\phi)$$

If one designates the magnetic flux that is determined by the sensor Lsi at the measurement position described by the polar angle $\alpha_i$ by $H_i$ (i=1,2,3,5,6,7) i.e. $Hi=B_e(\alpha_i)$ with i=1,2,3,5,6,7, then the Cartesian coordinates XR, YR of the deflection of the rotor 1 can be determined in accordance with the following relationship:

$$\begin{bmatrix} XR \\ YR \end{bmatrix} = \frac{d_0}{(H_1 - H_5)^2 + (H_3 - H_7)^2} \cdot \begin{bmatrix} (H_1 - H_5) & (H_3 - H_7) \\ -(H_3 - H_7) & (H_1 - H_5) \end{bmatrix} \cdot \begin{bmatrix} (H_1 + H_5) - (H_3 + H_7) \\ 2(H_2 + H_6) - (H_3 + H_7) - (H_1 + H_5) \end{bmatrix}$$

It can be seen that the radial position of the rotor 1 can thus be determined directly from the values of the magnetic flux produced by the rotor 1 at the six measurement positions without the actual value of the rotor angle $\alpha_R$ having to be explicitly known or calculated for this purpose. The radial position of the rotor 1 thus directly results by very simple additive or multiplicative combinations of the magnetic fluxes found at the measurement positions. More complicated computing operations, such as trigonometric computations or comparisons with electronically stored look-up tables are not necessary. This has the advantage that the determination of the radial position of the rotor is numerically very simple and can thus also take place very quickly which has a positive effect on the achievable frequency of measurement and thus on the regulation of the rotor position.

It will be understood that the arrangement of the sensors LS1, LS2, LS3, LS5, LS6, LS7 shown in FIG. 10, and in particular the specific values of the angle ai are to be understood by way of example. Other arrangements of the sensors are entirely possible and the determining equation for XR and YR must then be correspondingly adapted. Having regard to the number of sensors, numerous other variants are also possible. If one, however, wishes to determine the radial rotor position of the sinusoidally magnetised rotor 1 for every desired angle of rotation $\alpha_R$ without having to explicitly know the actual rotor angle $\alpha_R$, then at least five sensors or sensor elements must be provided, that is to say the magnetic flux produced by the rotor 1 must be determined at at least five different measurement positions.

An embodiment in accordance with the third example with only five sensors LS1, LS2, LS3, LS5, LS7 can for example be so realised that one dispenses in the arrangement shown in FIG. 10 with the sensor LS6. The five sensors are then arranged at the polar angles $\alpha_1=0°$; $\alpha_2=45°$; $\alpha_3=90°$; $\alpha_5=180°$ and $\alpha_7=270°$. For the Cartesian coordinates XR, YR of the deflection the following then applies:

$$\begin{bmatrix} XR \\ YR \end{bmatrix} = \frac{d_0}{(H_1 - H_5)^2 + (H_3 - H_7)^2} \cdot \begin{bmatrix} (H_1 - H_5) & (H_3 - H_7) \\ -(H_3 - H_7) & (H_1 - H_5) \end{bmatrix} \cdot \begin{bmatrix} (H_1 + H_5) - (H_3 + H_7) \\ C \end{bmatrix}$$

with $C=4(H_2-0.25[(H_1+H_5)+(H_3+H_7)]-0.5[(H_1-H_5)+(H_3-H_7)]\cos 45°)$.

Preferably, such embodiments of the third example are, however, provided in which an even number of sensors, i,.e. for example six—as described above—or eight sensors, etc. are provided which are in particular respectively arranged lying diametrically opposite to one another pairwise. A symmetrical arrangement of the sensors of this kind has namely the advantage that tilted positions of the rotor 1 can be more simply compensated from a technical regulating view point. Moreover, a symmetrical sensor arrangement of this kind reacts significantly less sensitively to axial shifts of the rotor.

Naturally the sensor arrangement in accordance with the invention or the method in accordance with the invention respectively is not restricted to the patterns of the rotor magnetisation which are explicitly described here. They are in particular also suitable for permanent magnetic rotors with higher numbers of pole pairs and/or other patterns of the magnetisation.

What is claimed is:

1. A method for the determination of the radial position of a permanent magnetic rotor (1) in an electromagnetic rotary drive which is designed as a bearing free motor with a stator (2) and the magnetically journalled rotor (1) forming both the magnetic bearing support for the rotor and the magnetic drive for the rotor comprising:

providing a permanent magnetic rotor (1) for rotation within the stator (2);

providing a stator (2) defining spatial intervals for rotation of the permanent magnetic rotor (1) between the stator (2) and the permanent magnetic rotor (1) to permit rotation of the permanent magnet rotor within the stator (2), the stator (2) having windings (22) for imparting adjustable magnetic flux from the stator (2) to the permanent magnet rotor (1) to form the magnetic bearing support and the magnetic drive;

providing at least two sensors (LS1, LS2);

placing the at least two sensors (LS1, LS2) in at least two different measurement locations with respect to the spatial intervals for rotation of the permanent magnetic rotor (1);

determining the magnetic flux of the permanent magnetic rotor (1) when centered with respect to the stator (2) at the placed sensors (LS1, LS2) to obtain a determined magnetic flux;

using the placed sensors (LS1, LS2) determining the actual flux measured when the permanent magnetic rotor (1) is rotated with respect to the placed sensors (LS1, LS2) to obtain a measured magnetic flux; and, determining the radial position of the rotor by evaluating the determined magnetic flux and the measured magnetic flux to adjust the adjustable magnetic flux to provide the magnetic bearing.

2. The method for the determination of the radial position of a permanent magnetic rotor (1) in an electromagnetic rotary drive that is designed as a bearing free motor according to claim 1 and wherein the steps include:

providing at most three sensors (LS1, LS2, LS3);

placing the three sensors (LS1, LS2, LS3) in three different measurement locations with respect to the spatial intervals for rotation of the permanent magnetic rotor (1)

determining the magnetic flux of the permanent magnetic rotor (1) when centered with respect to the stator (2) at the placed sensors (LS1, LS2, LS3) to obtain a determined magnetic flux;

using the placed sensors (LS1, LS2, LS3) determining the actual flux measured when the permanent magnetic rotor (1) is rotated with respect to the placed sensors (LS1, LS2, LS3) to obtain a measured magnetic flux; and, determining the radial position of the rotor by evaluating the determined magnetic flux and the measured magnetic flux to adjust the adjustable magnetic flux to provide the magnetic bearing.

3. The method for the determination of the radial position of a permanent magnetic rotor (1) in an electromagnetic rotary drive that is designed as a bearing free motor according to claim 2 and wherein:
- the determined flux of the permanent magnetic rotor (1) when centered with respect to the stator (2) at the placed sensors (LS1, LS2, LS3) includes zero crossings of the rotor magnetization; and,
- at least two sensors (LS1, LS2, LS3) are placed at angular positions with respect to the determined flux of the permanent magnetic rotor (1) to reside at positions other than a zero crossing of the rotor magnetization when one sensor (LS1, LS2, LS3) is at a zero crossing of the rotor magnetization.

4. The method for the determination of the radial position of a permanent magnetic rotor (1) in an electromagnetic rotary drive that is designed as a bearing free motor according to claim 1 and wherein the steps include:
- providing at least five sensors (LS1, LS2, LS3, LS5, LS7);
- placing the five sensors (LS1, LS2, LS3, LS5, LS7) in at least five different measurement locations with respect to the spatial intervals for rotation of the permanent magnetic rotor (1)
- determining the magnetic flux of the permanent magnetic rotor (1) when centered with respect to the stator (2) at the placed sensors (LS1, LS2, LS3, LS5, LS7) to obtain a determined magnetic flux;
- using the placed sensors (LS1, LS2, LS3, LS5, LS7) determining the actual flux measured when the permanent magnetic rotor (1) is rotated with respect to the placed sensors (LS1, LS2, LS3, LS5, LS7) to obtain a measured magnetic flux; and,
- determining the radial position of the rotor by evaluating the determined magnetic flux and the measured magnetic flux to adjust the adjustable magnetic flux to provide the magnetic bearing.

5. The method for the determination of the radial position of a permanent magnetic rotor (1) in an electromagnetic rotary drive that is designed as a bearing free motor according to claim 4 and wherein the steps include:
- providing an even number of sensors (LS1, LS2, LS3, LS5, LS6, LS7);
- placing the sensors (LS1, LS2, LS3, LS5, LS6, LS7) in at least six different measurement locations with respect to the spatial intervals for rotation of the permanent magnetic rotor (1)
- determining the magnetic flux of the permanent magnetic rotor (1) when centered with respect to the stator (2) at the placed sensors (LS1, LS2, LS3, LS5, LS6, LS7) to obtain a determined magnetic flux;
- using the placed sensors (LSl, LS2, LS3, LS5, LS6, LS7) determining the actual flux measured when the permanent magnetic rotor (1) is rotated with respect to the placed sensors (LS1, LS2, LS3, LS5, LS6, LS7) to obtain a measured magnetic flux; and,
- determining the radial position of the rotor by evaluating the determined magnetic flux and the measured magnetic flux to adjust the adjustable magnetic flux to provide the magnetic bearing.

6. The method for the determination of the radial position of a permanent magnetic rotor (1) in an electromagnetic rotary drive that is designed as a bearing free motor according to claim 1 and wherein the steps include:
- providing at least two sensors, each sensor having a first and a second sensor element;
- placing the at least two first sensor elements in at least two different measurement locations;
- placing the at least two second sensor elements in positions that are displaced by 180° with respect to the measurement locations in which the corresponding first sensor elements are placed when measured in a direction of rotation (D) of the permanent magnetic rotor (1).

* * * * *